J. N. WOOD.
BALING PRESS.
APPLICATION FILED FEB. 23, 1909. RENEWED JAN. 15, 1910.

967,478.

Patented Aug. 16, 1910.
12 SHEETS—SHEET 6.

J. N. WOOD.
BALING PRESS.
APPLICATION FILED FEB. 23, 1909. RENEWED JAN. 15, 1910.

967,478.

Patented Aug. 16, 1910.
12 SHEETS—SHEET 7.

WITNESSES:

INVENTOR
James Nelson Wood
BY
Attorneys

J. N. WOOD.
BALING PRESS.
APPLICATION FILED FEB. 23, 1909. RENEWED JAN. 15, 1910.

967,478.

Patented Aug. 16, 1910.
12 SHEETS—SHEET 8.

WITNESSES:

INVENTOR
James Nelson Wood
BY
Attorneys

J. N. WOOD.
BALING PRESS.
APPLICATION FILED FEB. 23, 1909. RENEWED JAN. 15, 1910.

967,478.

Patented Aug. 16, 1910.
12 SHEETS—SHEET 9.

WITNESSES:

INVENTOR
James Nelson Wood
BY
Whitaker Prevost Attorneys

J. N. WOOD.
BALING PRESS.
APPLICATION FILED FEB. 23, 1909. RENEWED JAN. 15, 1910.

967,478.

Patented Aug. 16, 1910.
12 SHEETS—SHEET 10.

J. N. WOOD.
BALING PRESS.
APPLICATION FILED FEB. 23, 1909. RENEWED JAN. 15, 1910.

967,478.

Patented Aug. 16, 1910.
12 SHEETS—SHEET 11.

WITNESSES:
INVENTOR
James Nelson Wood
BY
Attorney

J. N. WOOD.
BALING PRESS.
APPLICATION FILED FEB. 23, 1909. RENEWED JAN. 15, 1910.

967,478.

Patented Aug. 16, 1910.
12 SHEETS—SHEET 12.

WITNESSES:

INVENTOR
James Nelson Wood
By
Whitaker Prevost
Attorneys.

UNITED STATES PATENT OFFICE.

JAMES NELSON WOOD, OF RICHMOND, VIRGINIA, ASSIGNOR TO THE NEELY COMPRESS AND COTTON CO., INC., OF RICHMOND, VIRGINIA.

BALING-PRESS.

967,478. Specification of Letters Patent. Patented Aug. 16, 1910.

Application filed February 23, 1909, Serial No. 479,380. Renewed January 15, 1910. Serial No. 538,285.

*To all whom it may concern:*

Be it known that I, JAMES NELSON WOOD, citizen of the United States, residing at Richmond, in the county of Henrico and State of Virginia, have invented certain new and useful Improvements in Baling-Presses; and I do hereby declare the following to be a full, clear, and exact description of the invention, such as will enable others skilled in the art to which it appertains to make and use the same.

My invention consists in the novel features hereinafter set forth reference being had to the accompanying drawings which illustrate one form in which I have contemplated embodying my invention and said invention is fully disclosed in the following description and claims.

Referring to the said drawings.

In the form of baling press which I have selected for the purpose of illustrating my invention, and which is clearly shown in the accompanying drawings, 1 represents the main frame of the press which is supported upon a suitable foundation, preferably of masonry or concrete, below the baling floor which is indicated at 2, and is provided with an aperture through which the main frame extends vertically.

3 represents a vertically disposed baling frame, which is constructed to receive the bale box, in which the bale is formed. I prefer to employ a bale box which is separate from the baling frame, and is capable of being quickly inserted in and removed therefrom for the reason that by employing two or more of such removable bale boxes, the filled box can be removed, an empty box inserted, and another bale can be formed therein, while the previously formed bale is being secured by bale ties or bands in any well known way, and removed from its box, thus keeping the press in practically continuous operation. I have also shown herein the baling frame 3 pivoted at 4 adjacent to the bottom of the main frame, so that it can be oscillated during the formation of the bale. These constructions are preferred by me, but I wish it understood that the bale compressing and forming devices hereinafter described may also be employed with other forms of baling frames, and with other forms of bale boxes which may or may not be removable therefrom.

At the upper part of the main frame of the press are located a pair of baling rollers 5, 5 mounted on shafts 6, 6 which are supported in suitable bearings 7, 7. Each of these rollers 5 comprises a plurality of separated sections or disks of considerable thickness, the peripheral portions of each disk being provided with a series of notches or recesses 5$^a$ to prevent the rollers from slipping with respect to the cotton or other material from which the bale is composed. Each of the disks of one of said rollers is provided with a bar receiving notch 5$^b$ which is substantially semi-circular and which may take the place of one of the notches 5$^a$ (as here shown) or may be in addition thereto, as preferred. The disks composing the rollers 5, 5 are suitably spaced upon the shafts, and in this instance I provide between the disks eccentrics 8, the disks and eccentrics being keyed or otherwise secured to the shafts to turn therewith.

10, 10 represent a plurality of presser bars, which coöperate with the baling rollers in the formation of the bale. These presser bars are in two series arranged at opposite sides of the baling rollers, and alternating with, and extending between the disks thereof, said bars having their bottom or bale engaging faces extending substantially horizontally from the rollers, and said bars being so mounted that they can be moved toward and from the bale, the portions lying between the disks being alternately projected beyond the peripheries of the disks and retracted within the same. These presser bars thus act like huge fingers and positively press the top lap of the bat upon the bale with an added force and movement, after it has been acted on by the rollers, and said bars operate upon the bale on each side of the rollers and beyond the bale engaging portions of the same, as will be readily understood. In the press shown in the drawings each of the presser bars 10 is provided at its inner end with an eccentric strap portion 10$^a$ to engage one of the eccentrics 8, and the outer end of the bar is provided with a slot 10$^b$ which has a sliding engagement with a supporting bar or shaft 9, secured in the main frame of the machine.

It follows from the construction described that when the rollers 5 are rotated, the series of presser bars connected with each roller is given a movement toward and from the bale, and incidentally a horizontal back and forth movement, the slots 10$^b$ permitting the bars to follow the movements imparted thereto by the eccentrics 8. In the press herein shown, in which an oscillating baling frame is employed, I prefer to set the eccentrics alike on the two shafts 6, 6, so that as the shafts rotate toward each other the eccentrics of one will have a lead of a half revolution over those of the other, thus depressing the two series of bars 10 in alternation. The driving gearing for the rollers 5, 5 and presser bars 10, 10 is also timed, as hereinafter described with the mechanism for imparting movement to the oscillating baling frame 3, so that the bale will be always in proper relation with the presser bars to receive the downward thrust thereof, at the proper times and places, during the formation of the bale.

In the machine illustrated in the drawings, 15 represents the main driving shaft, to which power is applied in any desired manner from a suitable motor. The shaft 15 is shown provided with fast and loose pulleys 15$^a$, 15$^b$ to receive a belt from a suitable source of power. The driving shaft 15 is provided at one side of the machine with a driving pinion 16, meshing with a large gear 17 on a shaft 18 extending parallel to the driving shaft and provided on the opposite side of the machine with a pinion 19 meshing with a large gear wheel 20, on one of the shafts 6, 6 of the baling rollers, the shafts 6, 6 being geared together by intermeshing gears 21, 22. The gear 22 also meshes with and drives a gear wheel 23, on a transverse shaft 24, carrying at its opposite end a gear 25 which meshes with a gear 26 on a shaft 29 carrying one of a pair of feed or condensing rollers 30, 30, the other roll having its shaft 28 provided with a gear 27 meshing with the gear 26. These rollers 30, 30 are mounted above the baling rollers and the cotton bat is delivered thereto in any desired manner.

Figure 2:
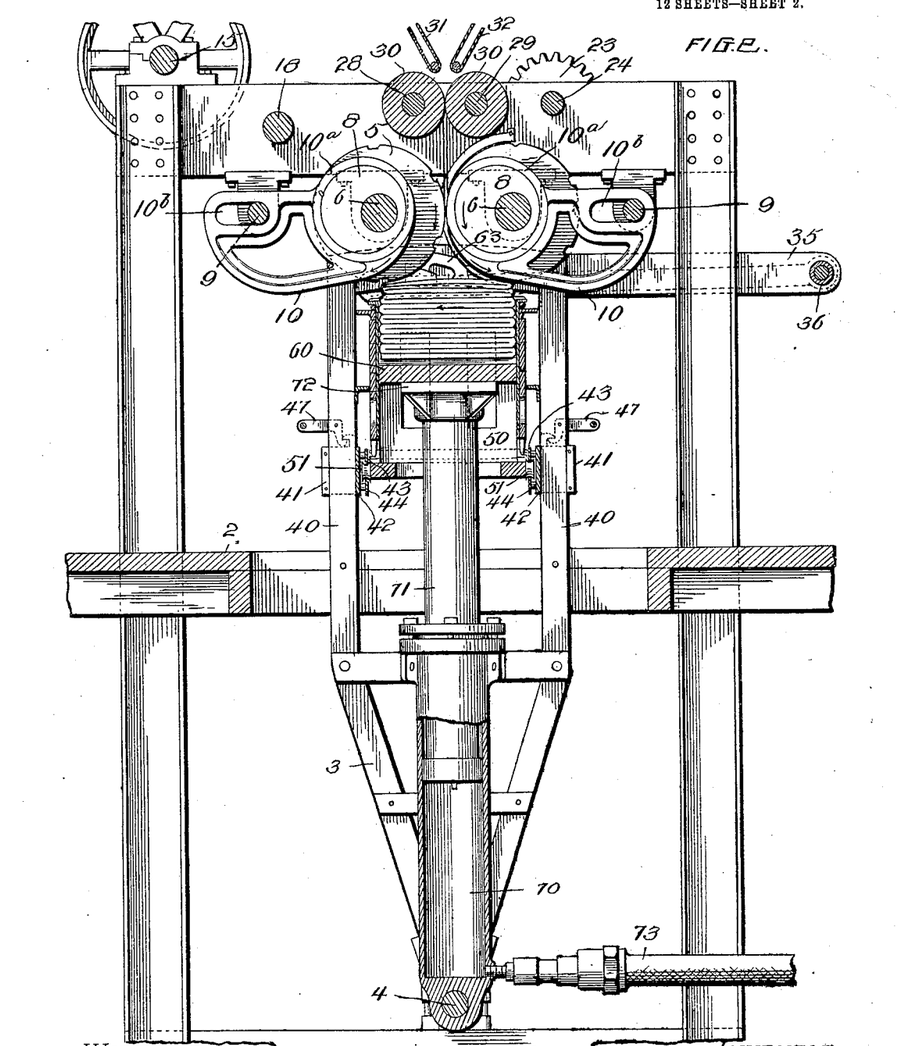
Fig. 2 is a vertical, sectional view of the press showing the bale box in raised position in the baling frame, and a partially completed bale therein.

In the drawings, Fig. 2, I have shown a pair of oppositely inclined conveyers 31, 32, for supplying the cotton to the condensing rollers, and these belts may be driven in any desired manner (not shown).

In order to impart the proper oscillatory motion to the baling frame 3, in time with the movements of the presser bars, I provide for operating the baling frame from one of the shafts 6, which in this instance carries the eccentrics for operating the connected series of presser bars, and is directly geared with the shaft of the other baling roller. The said shaft 6 (being the one to the left in Figs. 1 and 2) is provided with two crank pins 33, 33, one of which is carried on a crank arm 34 at one side of the machine and the other pin 33 being carried by the large gear 20, on the opposite side of the machine. The oscillating baling frame is provided with laterally extending arms 35, 35 at one side of the same carrying a cross bar 36. Links 37, 37 connect the crank pins 33 and the cross bar 36 and thus provide for the oscillation of the frame in proper timed relation with the movements of the presser bars.

The oscillating baling frame is provided with four vertically disposed standards 40, upon each of which is mounted a vertically movable slide 41. These slides are connected in pairs by transversely extending bars 42, parallel with the axes of the baling rollers. Each of the bars 42 is provided with an upper and a lower track or rail 43 and 44 respectively to engage the upper and lower portions of grooved wheels 51, 51 with which the bale box 50 is provided. The slides 41 carrying the bale box are adapted to be raised upon the standards 40 as hereinafter described, and locked in raised position in any desired way. I have shown for this purpose, hook shaped locking devices 45 on each of the slides 41 and pivoted catches 46 secured to standards 40, in position to be engaged by said locking devices 45. The catches 46 are each provided with an arm 47 and said arms 47 are connected in pairs by cross bars 48, 48$^a$ for simultaneous movement.

49 represents a cord, chain or other flexible connection which extends from the rod 48$^a$ around suitable pulleys, or guides to the rod 48 so that by elevating the rod 48, which can be accomplished by a slight blow even when the bale box contains a bale, all of the catches 46 are simultaneously withdrawn from the locking devices 45, to permit the bale box and the slides 41 to fall to their lowest position. The slides 41 are held in their lowest position by suitable stops or projections 41$^a$, 41$^a$ on the standards 40, and at such a level that the bale box can be shoved from the adjacent baling floor 2, directly into the baling frame, the rollers 51 entering between the rails 43 and 44.

The bale box 50 is preferably of knock down structure as shown in detail in Figs. 15 to 18 inclusive, to facilitate the removal of the bale, although it may be made in other ways. As here shown it comprises a rectangular bottom frame 52, provided on opposite sides with the grooved rollers 51, which project far enough below said frame to support the box and enable it to be rolled when it is on the baling floor and in moving it into and out of the baling frame. At each end of the bottom frame are the pivoted end walls or sections 53, 53 hinged or pivoted to the bottom frame at 54, 54 and provided at or near their upper ends with notches 55 and locking devices 56, the latter being shown as pivoted hooks.

57, 57 represent the side walls of the bale box, which are provided at their lower ends with trunnions 58, engaging pivotal bearings on the bottom frame, and having at their upper edges longitudinally projecting studs 59, which enter the notches 55 in the end walls, and are secured therein by the locking hooks 56, when the box is in closed position as clearly shown in the drawings. The studs 59 are here shown as being the end portions of a continuous bar extending along the top edge of each side wall 57, and this construction is simple and strong.

60 represents the bottom of the bale box, which normally rests upon the bottom frame but is free to be moved vertically through the box. The top face of the bottom plate 60 is provided with a plurality of transverse grooves 61, to facilitate the insertion of bale ties, bands or wires after the bale is formed, and the side walls are cut, preferably, away at their lower edges between the trunnions 58, to accommodate burlap or other wrapping, for the bale which is preferably laid upon the bottom 60 before the bale is formed.

Certain of the walls of the box (in this instance the side walls) are provided near their upper edges with very short projections or studs 62 to engage the bottom 60 when the latter is moved upward through the box and limit its upward movement with respect to the box. These studs are preferably so located that they will lie within certain of the bale tie recesses 61 and will not project above the bottom 60 and they are advantageously beveled on their upper sides.

Each of the end walls 53 of the box is provided at its upper edge with a pivoted locking device for engaging and holding a retaining bar, which is forced upon the top of the bale after it is completed, so as to permit of the removal of the bale and box, from the baling frame and the subsequent tying and wrapping of the bale without appreciable expansion of the bale. In this instance the end walls 53 are shown each provided with a pivoted hook shaped locking device 63 mounted on a pivot 64 and provided with a retracting spring 65. Adjacent to the open end of each of the hook shaped locking devices, I also provide a bar guide 66, which guides coöperate with stationary bar guides on the main frame adjacent to the bar inserting baling roller as hereinafter described, to retain the bar in place in said roller until it is carried beneath the hooks 63 and securely locked to the bale box.

The baling frame is provided with a suitable pressure device for applying pressure to the bottom of the bale box, against which the bat is rolled in, in folds or laminations in a well known manner and compacted by the rollers, and the pressure bars, said pressure device being arranged to yield gradually as the bale is formed and permit the bottom of the bale box to recede. In the drawings I have shown the baling frame provided with a hydraulic cylinder 70 mounted rigidly therein, and provided with a piston 71 which carries at its upper end a plunger 72, adapted to engage the bottom 60 of the bale box as hereinafter described, and capable of extending up into the box through a suitable opening in the bottom frame 52 thereof. The cylinder 70 is connected by a pipe 73, with a suitable pump or forcing device (not shown) and in connection therewith I employ the usual relief or escape valve which is adjustable so as to open when the desired predetermined pressure is reached.

Figure 1:
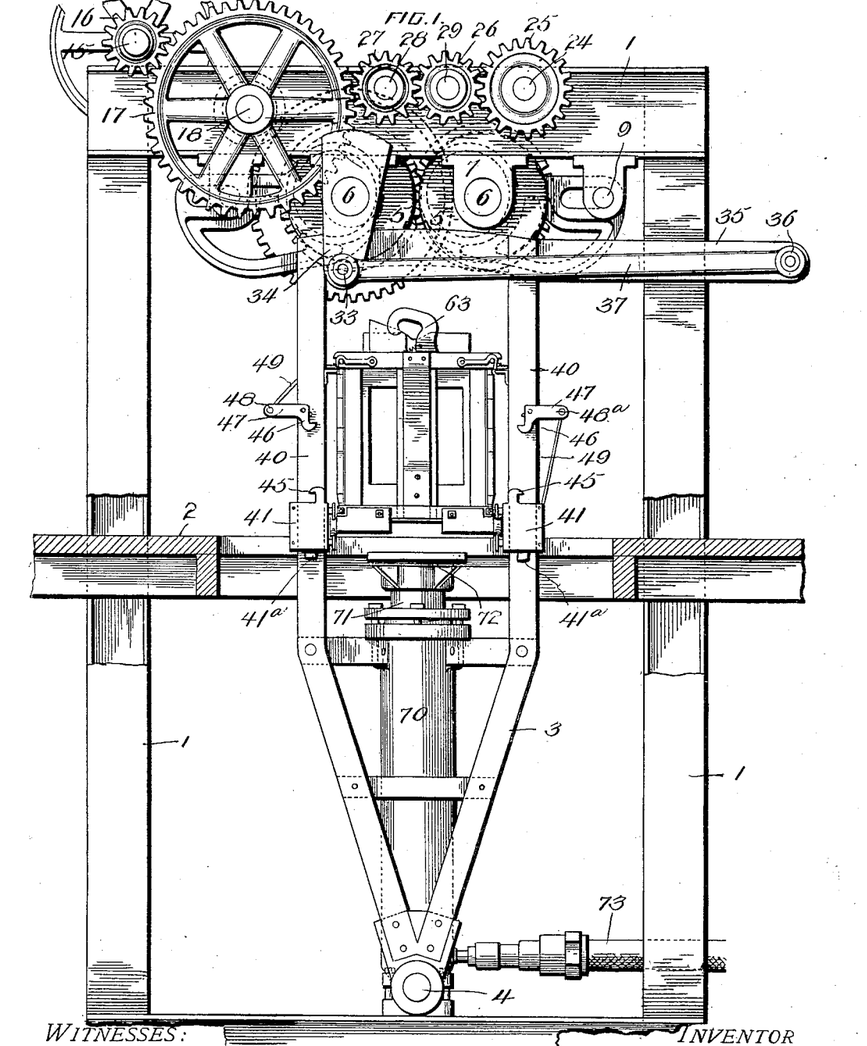
Figure 1 is a side elevation of a baling press embodying my invention showing the bale box in the position in the oscillating baling frame, which it occupies when run in from the baling floor.
Figure 3:
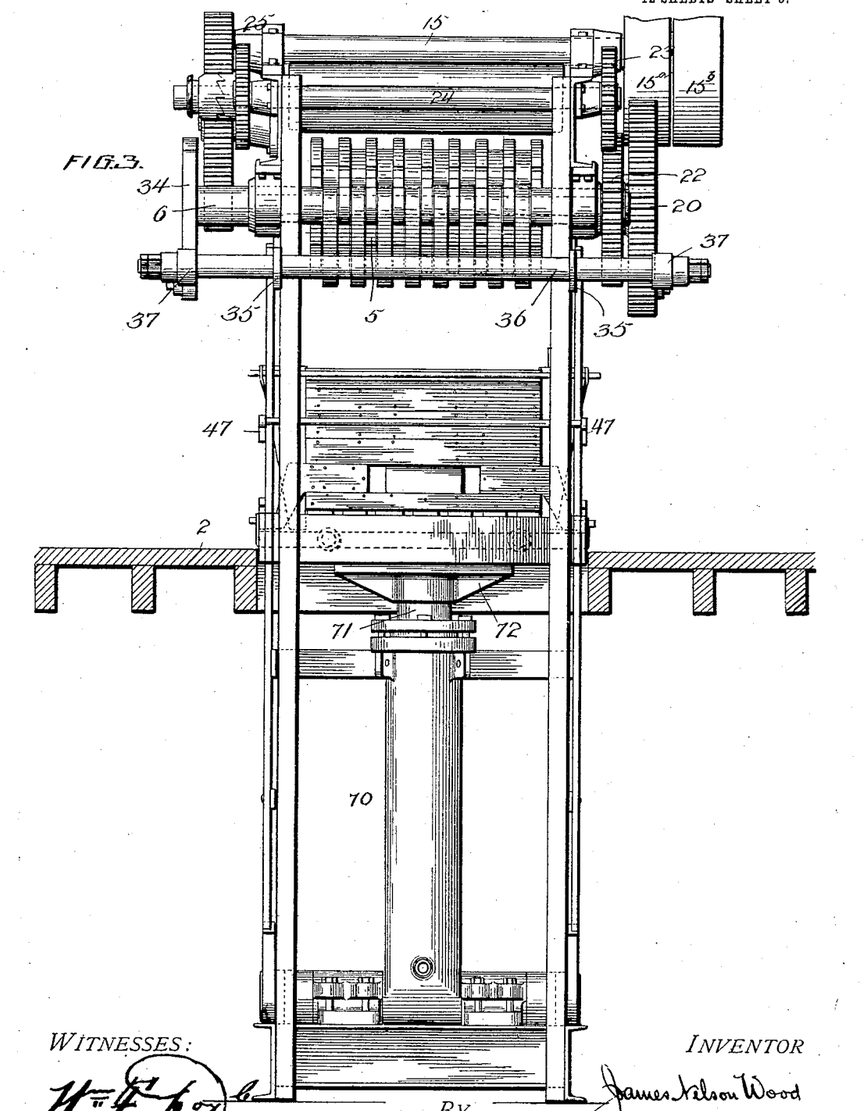
Fig. 3 is an end elevation of the press, in the position shown in Fig. 1.
Figure 4:
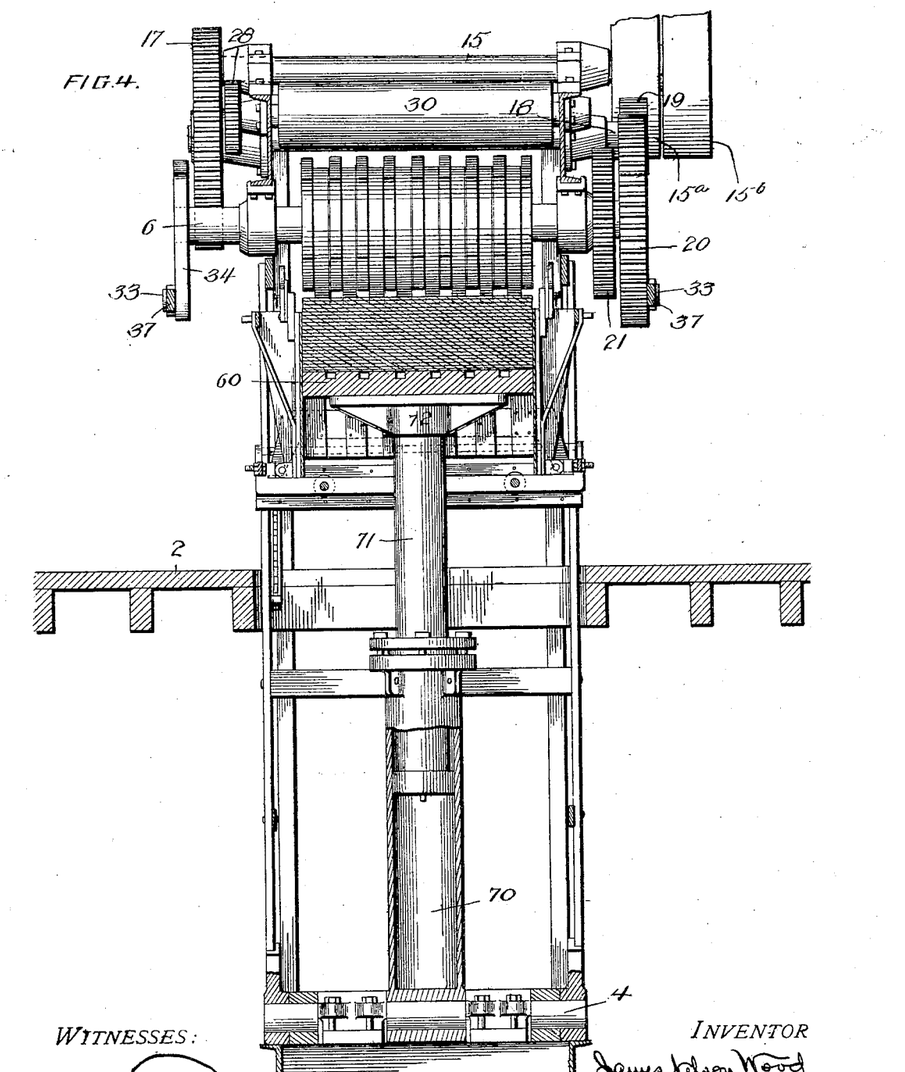
Fig. 4 is a vertical sectional view of the press with the parts in the position shown in Fig. 2 taken on a plane at right angles to the plane of section in that figure.
Figure 5:
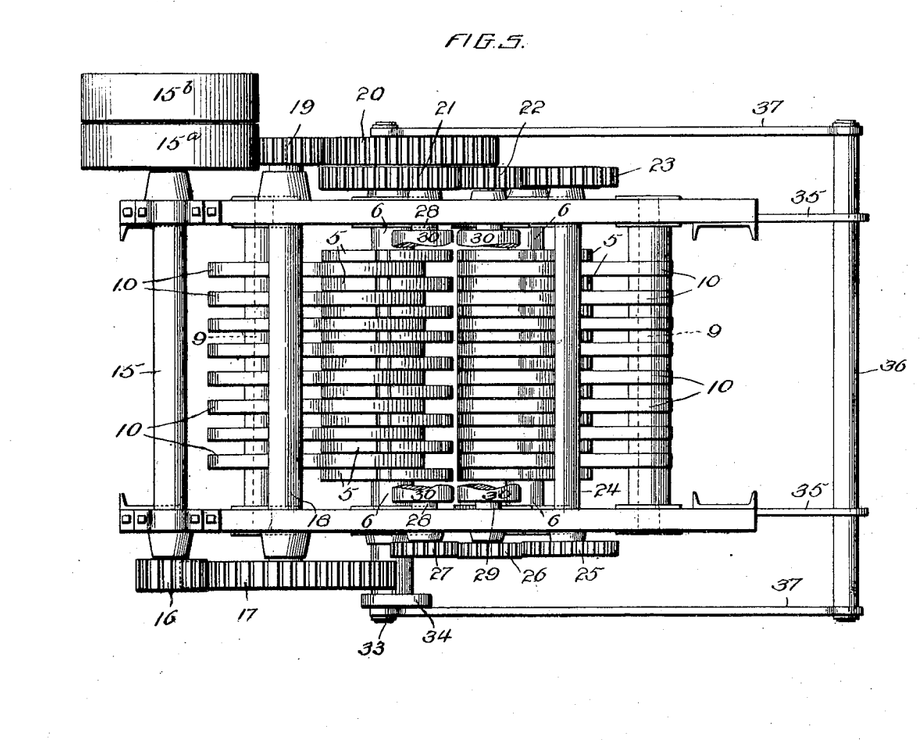
Fig. 5 is a top plan view of the machine.
Figure 6:
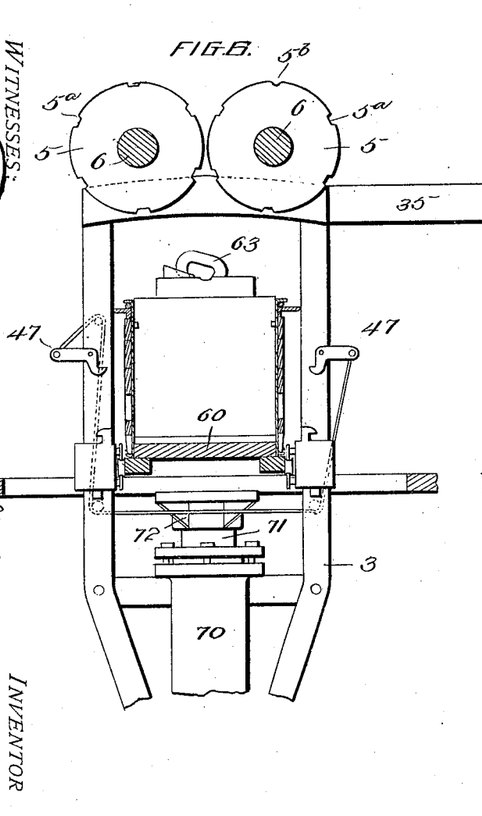
Fig. 6 is a partial view, in the nature of a diagrammatic view, showing the relations of the baling rollers, the bale box and baling frame, the parts being shown in the position which they occupy when the bale box is inserted in the baling frame.
Figure 7:
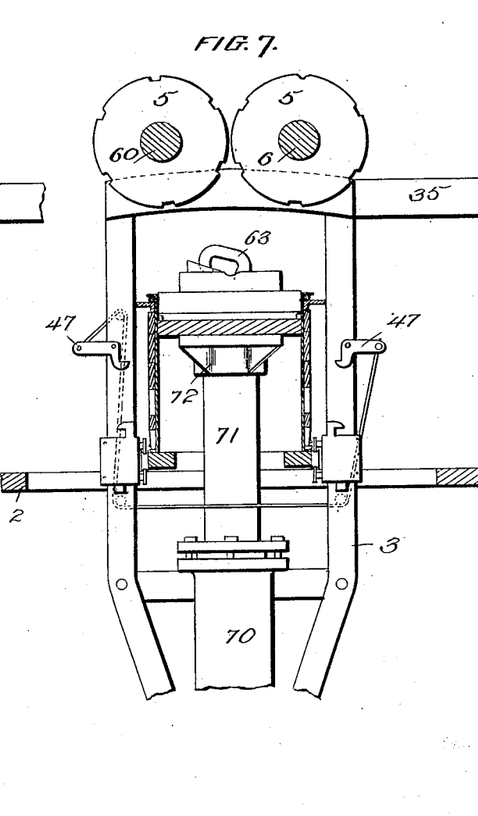
Fig. 7 is a view similar to Fig. 5, but showing the bottom of the bale box raised therein by the plunger of the pressure applying mechanism.
Figure 8:
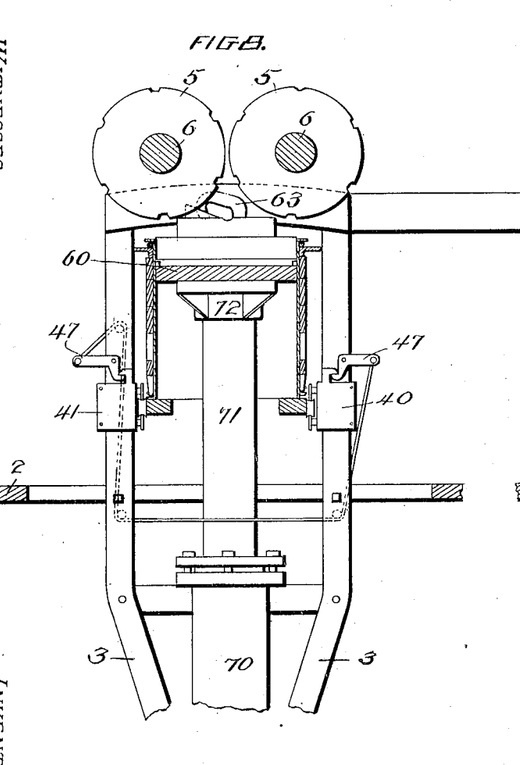
Fig. 8 is a similar view showing the position of the parts when the bale box has been raised in the baling frame, and locked in raised position prior to the commencement of the formation of a bale.

The operation of the press is as follows. The baling frame 3 being in its mediate position in which it is substantially vertical, a bale box is run into the baling frame, as shown in Figs. 1, 3 and 6, the grooved rollers passing between the rails or tracks 43 and 44. When the bale is to be covered, as is usually the case, a strip of burlap or other material large enough to pass entirely around the finished bale is placed in the bale box with its central portion spread upon the movable bottom and the end portions accommodated beneath the cut away portions of the side walls of the box, so as to be out of the way of the bale. Pressure fluid is then forced into the cylinder 70 and the piston is raised to bring the plunger 72 into engagement with the movable bottom of the bale box, and raise said bottom within the box until it engages the lateral studs 62, 62, see Fig. 7, when the bale box will be raised bodily by the further upward movement of the plunger carrying with it the rails or tracks and the slides 41 until the locking devices 45 engage the catches 46, thus locking the bale box in raised position ready to receive the material which is to form the bale, (see Fig. 8). The driving shaft 15 is then started, imparting motion to the baling rollers and the presser bars, as previously described, and causing the baling frame 3 to oscillate carrying with it the bale box. The material (ordinarily cotton) is then fed into the machine in any desired manner, to the feed rolls 30, which deliver it in a sheet or bat downwardly between the baling rollers, upon the movable bottom of the bale box. The oscillation of the baling frame causes the bat to fold upon itself in laps or laminations as indicated in the drawings, and a number of laps or folds are laid upon the bottom plate 60 before any considerable pressure is applied to the cylinder 70. The pressure is then increased to nearly the pressure at which the relief valve is set, and the folds are laid one upon another and pressed firmly down against the bottom of the bale box, by the baling rollers, and the presser bars, expressing the contained air therefrom and increasing the density of the material until the pressure exerted on the material between the baling rollers and presser bars and the movable bottom reaches that for which the relief valve is set when the relief valve will permit the bottom to yield slightly with the plunger and piston, the operation continuing thereafter until the bale is completed.

It is to be noted that as the bale box passes beneath one of the baling rollers, moving outward from a central position the bat is compressed beneath the roller against the partially completed bale, and the top layer then comes beneath the bale engaging faces of one series of presser bars, which incline downwardly away from the adjacent baling roll, thus producing a lateral wedging action, which of itself tends to press the cotton downward with great force, and this is accomplished at comparatively small expenditure of power, as the connections between the baling frame and its operating cranks are at such a great distance from the axis of oscillation. Further than this the eccentrics cause the presser bars to bear downward with great and additional pressure upon the top layer of the bale, thus further compressing it and expelling the included air therefrom. I have found by practical demonstration that with a press constructed as herein shown and described, I am able to secure a maximum of density in the finished bale, with a comparatively small expenditure of power, which I attribute to the perfection and uniformity with which each layer is compressed upon those below it, as the formation of the bale proceeds.

Figure 9:
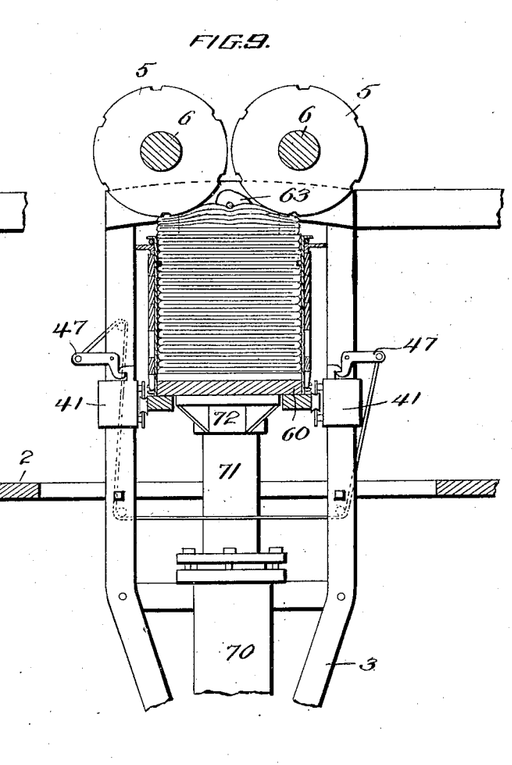
Fig. 9 is a similar view showing the bale completed and held in position by the retaining bar, previous to the dropping of the bale box and its removal from the press.
Figure 10:
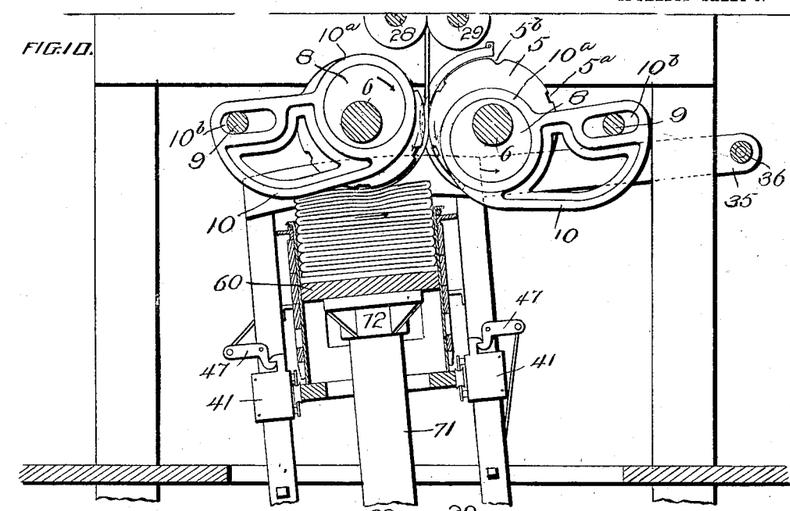
Fig. 10 is a view similar to Figs. 5 to 8, but showing the presser bars, and illustrating their action in the formation of the bale, the oscillating baling frame being shown at one end of its lateral movement.
Figure 11:
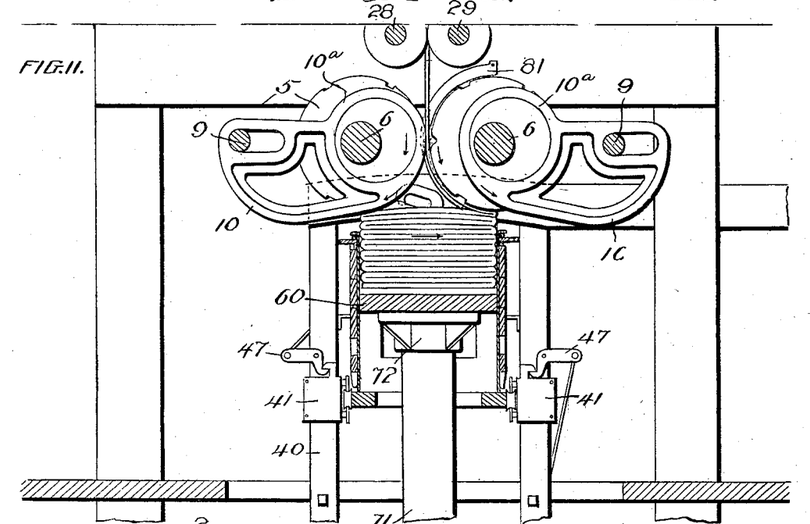
Fig. 11 is a view similar to Fig. 9 showing the oscillating baling frame in mediate position.
Figure 12:
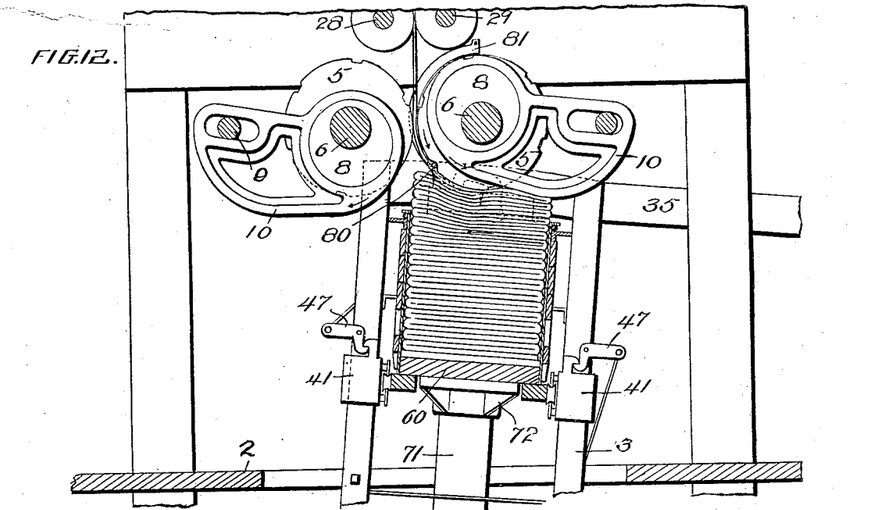
Fig. 12 is a view similar to Figs. 9 and 10, showing the bale completed, and the baling frame and bale box in position to receive the retaining bar.
Figure 13:
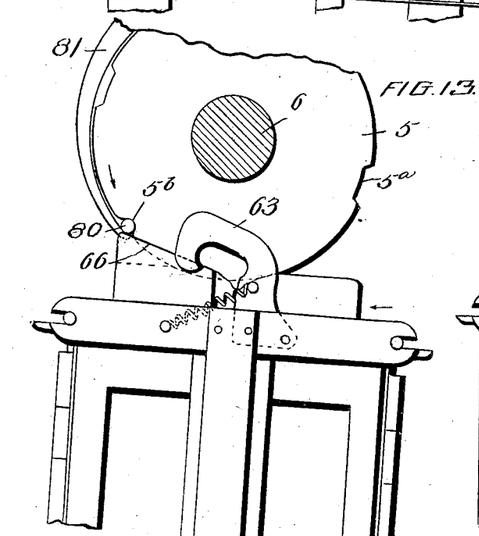
Figs. 13 and 14 are enlarged detail views of portions of one of the baling rollers, the bale box and adjacent parts and illustrating the manner of inserting the retaining bar.
Figure 14:
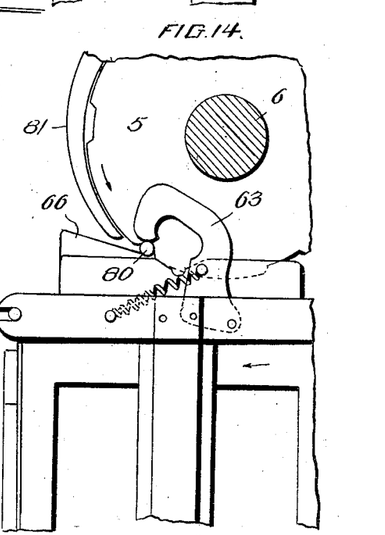
Figure 15:
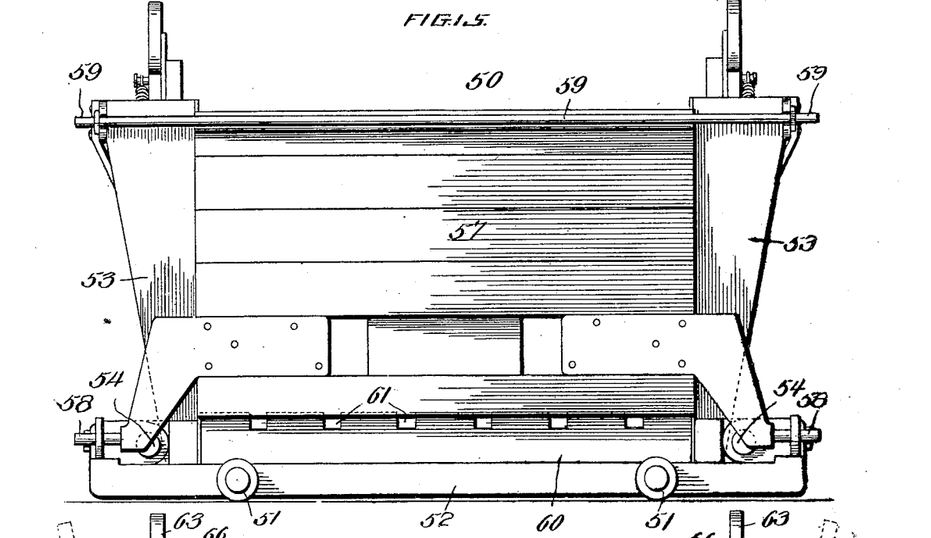
Fig. 15 is an enlarged detail elevation of the bale box detached.
Figure 16:
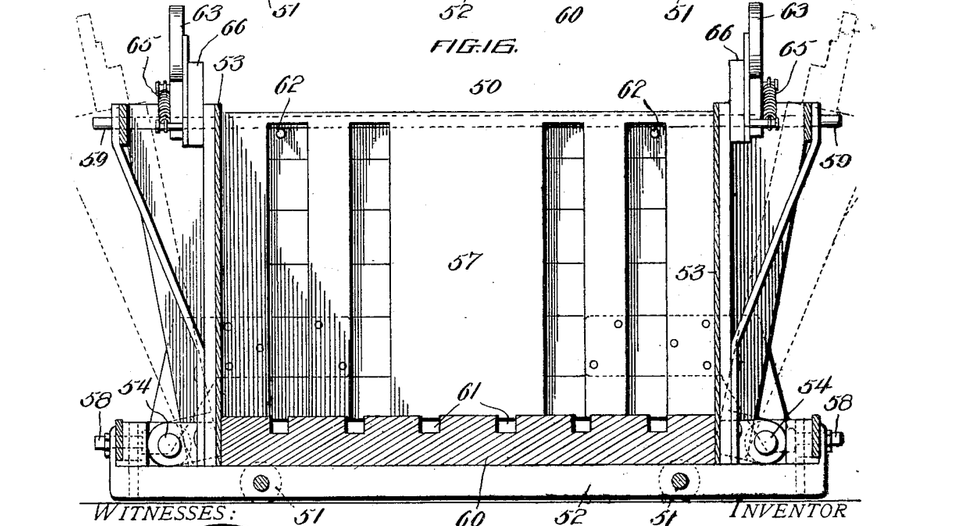
Fig. 16 is a vertical longitudinal sectional view of the same.
Figure 17:
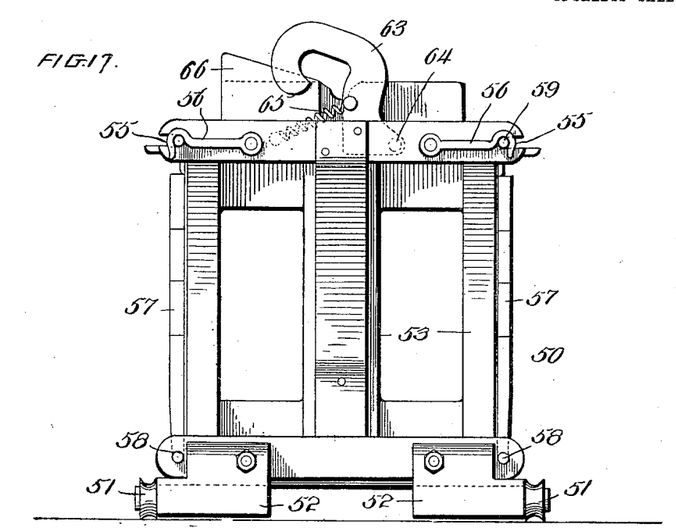
Fig. 17 is an end view of the bale box.
Figure 18:
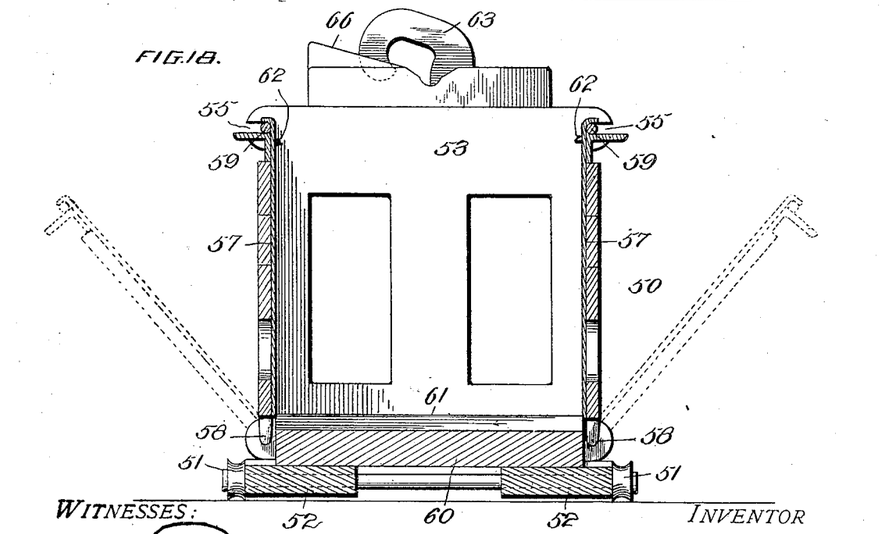
Fig. 18 is a transverse vertical sectional view of the same.
Figure 19:
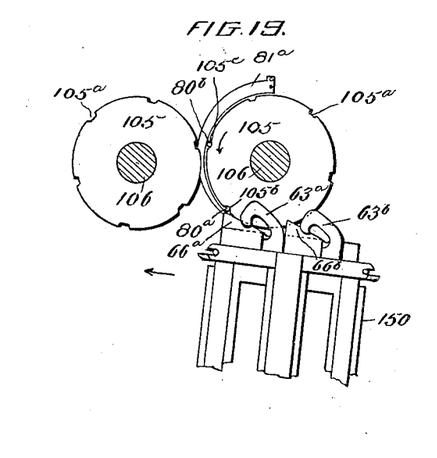
Figs. 19, 20, 21 and 22 are detail views illustrating a modification in which the bale box is provided with bar locking devices to receive two retaining bars, and one of the baling rollers is constructed to insert said bars one after the other.

When the bale is completed the bottom 60 will have been forced downwardly within the bale box until it rests upon the bottom frame 52 thereof, as indicated in Fig. 12, and a retaining bar is then inserted by the press, as before indicated to hold the bale against expansion until it can be tied. The manner of inserting this bar will be apparent from an examination of Figs. 12, 13 and 14. The bar 80 is placed in the notches or recesses 5$^b$ of one of the baling rollers (the one on the right in the figures mentioned) while said recesses are at the top, and the bar will be carried downward toward the bale, by the rotary movement of the roller. In order to prevent the bar from escaping from the notches 5$^b$, I provide stationary curved guides 81 located at opposite ends of the roller and supported from the main frame, said guides having their inner edges curved concentrically with the axis of the roller. As the bar 80 is being carried downward, the bale box is being moved from its extreme position (at the right in said figures) toward the mediate position as indicated by the arrow in Fig. 12, so that the bar locking hooks 63 are moving toward the bar. As the bar nears the hooks 63, it passes off of the lower ends of the stationary guides 81 and into engagement with the top faces of the guides 66 on the bale box, thus keeping the bar in engagement with the roller 5, and preventing the cotton from wedging between the roller and the bar. The bar is carried into engagement with the locking hooks 63, which yield to allow it to pass under when they snap over the bar and the further movement of the oscillating baling frame toward the center, carries the bar out of engagement with the roller altogether, as shown in Fig. 9. The bale is now ready to be removed. The pressure in cylinder 70 is relieved, the catches 46 are withdrawn and the bale box permitted to drop, in the frame 3, when it can be rolled on the tracks 43, 44, out onto the baling floor, an empty box being rolled into the frame 3, so that another bale can be immediately formed, while the bale just completed is wrapped and tied.

To wrap and tie the completed bale, the hooks 56 are raised and the side walls 57 are permitted to fall into horizontal position. The burlap or other wrapper is then wrapped around the bale, over the bar 80, which is still held by the hooks 63, and bale ties of any desired kind are passed through the grooves 61 in the bottom plate 60, beneath the bale and around the bale and bar and firmly secured in place. The bar is then seized at one end, by a suitable tool, and withdrawn longitudinally, by hand or by any other suitable means. The ends of the bale are then covered with burlap, which is sewed to the main portion or otherwise secured in place.

Figure 20:
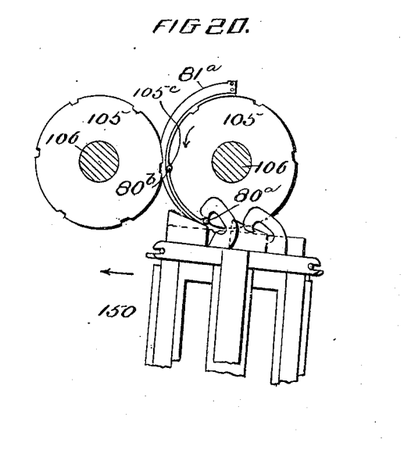
Figure 21:
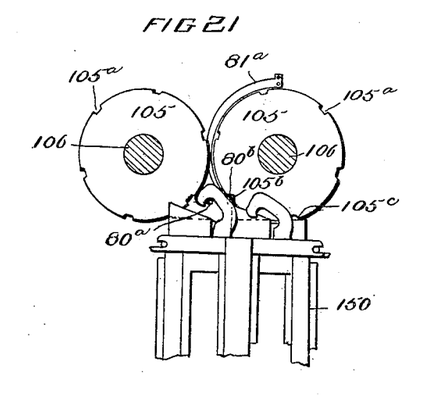
Figure 22:
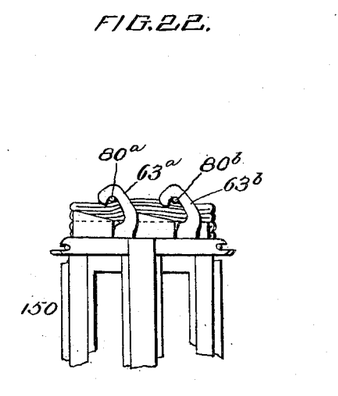

In Figs. 19 to 22 inclusive, I have shown a slight modification of the bale box here lettered 150 and the bar inserting baling roller in which the bale box is provided with two bar locking hooks at each end, 63$^a$ and 63$^b$ and the bar inserting baling roller is constructed to insert two retaining bars 80$^a$ and 80$^b$, for the purpose of retaining the bale until it can be wrapped and bound or otherwise secured, as clearly illustrated in Fig. 22. In these figures 105, 105 represent the baling rollers which are provided with the recessed portions 105$^a$ to give them the proper hold upon the bat and the bar inserting roller, shown at the right in these figures has its disks provided with two bar receiving notches 105$^b$ and 105$^c$, to receive two retaining bars 80$^a$ and 80$^b$ to be inserted one after the other in the locking hooks 63$^a$ and 63$^b$ of the bale box. The guides 81$^a$ fixed to the frame of the machine hold the retaining bars in engagement with the bar inserting baling roller, as heretofore described and the bale box is provided at each end with two bar guides 66$^a$ and 66$^b$, one adjacent to each of the locking hooks to coöperate with the stationary guides 81$^a$, as hereinbefore described. The figures referred to clearly illustrate the manner in which the bars 80$^a$ and 80$^b$ are successively inserted. Referring thereto, it will be noted that the coöperating movements of the bar inserting baling roller and the bale box will cause the first retaining bar 80$^a$ to pass from engagement with the fixed guides 81$^a$ onto the bale box guides 66$^a$ and into engagement with locking hooks 63$^a$ in the manner previously described, raising said hooks as shown in Fig. 20 until they snap over the bar, when the further movements of the parts in the directions indicated by arrows in these figures, will carry the bar 80$^a$ out of the notches in the baling roller, as shown in Fig. 21. The further movements of the parts will bring the bar 80$^b$ into engagement with the bale box guide 66$^b$ and then along said guides into engagement with the hooks 63$^b$, which will rise and snap over said bar, when the bale box will be in substantially vertical position and may be discharged from the machine by relieving the pressure of the pressure cylinder, releasing the catches 46, and permitting the bale box to drop to its lowest position, when it can be pushed out onto the baling floor.

The form of bale box herein shown and described, is not specifically claimed herein as it is claimed in a separate application filed by me April 23, 1909, Serial No. 491,853.

What I claim and desire to secure by Letters Patent is:—

1. In a baling press, the combination with the baling rollers comprising spaced bale engaging sections, of pressure devices interposed between the sections of said rollers, and provided with bale engaging surfaces, and means for moving said pressure devices in a direction toward the bale beyond the periphery of the roller sections.

2. In a baling press, the combination with the baling rollers comprising spaced bale engaging sections, of pressure devices interposed between the sections of said rollers, and provided with bale engaging surfaces, and means for moving said pressure devices with respect to said roller sections outwardly toward the bale beyond the periphery of the roller sections, and inwardly away from the bale.

3. In a baling press, the combination with the baling rollers comprising spaced sections, of pressure bars, interposed between the separated sections of said rollers and having bale engaging portions, extending substantially horizontally therefrom, and means for moving said pressure bars toward and from the bale.

4. In a baling press, the combination with the baling rollers comprising spaced sections, of pressure bars interposed between the separated sections of said rollers, and having bale engaging portions extending substantially horizontally therefrom, means for moving said pressure bars toward and from the bale, a bale box, and means for moving said bale box back and forth beneath the said rollers and pressure bars.

5. In a baling press, the combination with the baling rollers comprising spaced bale engaging sections, of eccentric devices located between said sections, pressure bars having portions engaging said eccentric devices and provided with bale engaging faces extending substantially horizontally from the adjacent roller and supporting means for said pressure bars located eccentrically to said baling rollers.

6. In a baling press, the combination with the baling rollers comprising spaced bale engaging sections of eccentric devices located between and rotating with said sections, pressure bars having portions engaging said eccentric devices and located between the roller sections, and provided with horizontally extending bale engaging surfaces, said pressure bars being also provided with guiding slots at a distance from their adjacent roller and supports for said pressure bars engaging said slots.

7. In a baling press, the combination with a pair of baling rollers, each comprising a plurality of spaced sections, of eccentric devices located between said sections and adapted to rotate with their respective roller, a plurality of pressure bars for each roller, having portions engaging the said eccentric devices, and provided with bale engaging faces extending substantially horizontally from the adjacent roller, the eccentric devices being constructed to move the bale engaging faces of the pressure bars so as to project them beyond the peripheral portions of the rollers, and supporting means for said pressure bars located at a distance from said rollers.

8. In a baling press, the combination with the baling rollers, of a series of pressure bars arranged at each side of said rollers and provided with horizontally disposed bale engaging portions and means for moving said pressure bars toward and from the bale.

9. In a baling press, the combination of the baling rollers, of a series of presser bars arranged at each side of said rollers and provided with horizontally disposed bale engaging portions, means for moving said presser bars toward and from the bale, a bale box, and means for moving said bale box to and fro beneath the said baling rollers and presser bars.

10. In a baling press, the combination with the baling rollers, of a series of presser bars arranged at each side of said rollers and provided with horizontally disposed bale engaging portions, means for moving said presser bars toward and from the bale, an oscillating baling frame below said rollers and presser bars, a bale box carried thereby, and means for oscillating said baling frame.

11. In a baling press, the combination with the baling rollers, of a series of presser bars arranged at each side of the baling rollers, having bale engaging portions extending in a substantially horizontal direction, and eccentric devices engaging the said presser bars for moving them toward and from the bale.

12. In a baling press, the combination with the baling rollers, of a series of presser bars arranged at each side of the baling rollers and having bale engaging portions extending in a substantially horizontal direction, eccentric devices engaging said presser bars for moving them toward and from the bale, a bale box and means for moving said bale box to and fro beneath the said rollers and presser bars.

13. In a baling press, the combination with the baling rollers, of a series of presser bars arranged at each side of the baling rollers, and having horizontally disposed bale engaging portions, eccentric devices engaging said presser bars for moving them toward and from the bale, an oscillating baling frame, a bale box carried thereby, and means for oscillating said baling frame during the formation of the bale.

14. In a baling press, the combination with an oscillating baling frame, and a bale box carried thereby, of a pair of baling rollers each comprising spaced sections, presser bars interposed between said sections and having bale engaging portions extending substantially horizontally from said rollers, and means for moving said presser bars toward and from the bale box.

15. In a baling press, the combination with an oscillating baling frame, and a bale box carried thereby, of a pair of baling rollers, each comprising spaced sections, presser bars interposed between said sections and having bale engaging portions extending from said rollers in a substantially horizontal direction, and eccentric devices engaging said presser bars for imparting motion thereto toward and from the bale.

16. In a baling press, the combination with an oscillating baling frame, and a bale box carried thereby, of a pair of baling rollers each comprising spaced sections, eccentric portions interposed between said sections and rotating therewith, a plurality of presser bars arranged on each side of the baling rollers, the presser bars adjacent to each roller having portions engaging said eccentric portions thereof and having bale engaging faces disposed substantially horizontally, and a support for each series of presser bars arranged at a distance from adjacent rollers.

17. In a baling press, the combination with the baling rollers, each comprising a shaft, a plurality of spaced disks mounted on and secured to said shaft, and a plurality of eccentrics secured to the shaft between adjacent disks, two series of presser bars, one for each roller, each series comprising a plurality of bars provided at their inner ends with eccentric straps fitting said eccentrics and having slots adjacent to their outer ends, a supporting bar engaging the slots of all the presser bars of a series, each of said presser bars having a bottom bale engaging face.

18. In a baling press, the combination with baling rollers comprising spaced sections, presser bars located between said sections and having bale engaging portions extending substantially horizontally therefrom and means for moving said presser bars toward and from the bale, of an oscillating baling frame, a fluid pressure cylinder and piston carried thereby, a bale box carried by said frame and provided with a bottom plate movable vertically through said bale box, and a plunger connected with said piston for engaging said movable bottom plate.

19. In a baling press, the combination with the bale forming devices of a baling frame, a bale box carried thereby, means for elevating the bale box into operative position to receive a bale and locking means for holding the bale box in elevated position during the formation of a bale.

20. In a baling press, the combination with the bale forming devices, of a baling frame, a bale box carried thereby, and movable therein toward and from the baling means, and locking devices for holding the bale box in operative relation with the baling devices during the formation of a bale.

21. In a baling press, the combination with the baling rollers, of a baling frame, a bale box movable vertically in said frame and provided with a bottom movable vertically in said bale box, stops on said bale box for engaging said bottom, a pressure device having a part for engaging said bottom to elevate it in the bale box, and the bale box in said frame, and means for locking the bale box in its elevated position.

22. In a baling press, the combination with the baling rollers, of a baling frame, horizontally disposed rails secured to said frame and movable vertically therein, a bale box having portions to engage said rails, means for raising the bale box and said rails into operative relation with the baling rollers, and means for locking said rails in elevated position.

23. In a baling press, the combination with the baling rollers, of a baling frame, vertically movable slides mounted thereon, horizontal rails carried by said slides, a bale box provided with rollers for engaging said rails, means for elevating said bale box, rails and slides, and locking means for said slides for holding the bale box in elevated position during the formation of a bale.

24. In a baling press, the combination with the baling rollers, of a baling frame, vertically movable slides thereon, provided with locking devices, horizontal rails carried by said slides, a bale box provided with means for engaging said rails, catches on said frame for engaging said locking devices and holding the bale box in elevated position, and means for elevating the bale box, rails and slides.

25. In a baling press, the combination with an oscillating baling frame, vertically movable slides mounted thereon, horizontal rails carried by said slides, a bale box provided with grooved rollers for engaging said rails, and having a vertically movable bottom and stop lugs near the top of the box to engage said bottom, a pressure device provided with a plunger for elevating said bottom and the bale box, locking devices on said frame, for engaging devices on the vertically movable slides for locking said bale box and slides in raised position, and means for simultaneously releasing said locking devices to permit the bale box and slides to fall.

26. In a baling press, the combination with the baling rollers, of an oscillating baling frame, a bale box carried by and movable vertically in said frame, a bottom movable vertically in the bale box, said bale box being provided with stops to engage said bottom, a hydraulic cylinder and piston carried by said frame, said piston being provided with a plunger to engage said bottom to raise said bottom in the bale box and the bale box in said frame and means for locking said bale box in its raised position.

27. In a baling press, the combination with the baling rollers, of an oscillating frame, a bale box movable vertically therein, a plurality of catches for locking the bale box in raised position in said frame, and connections between said catches for causing them to be released simultaneously and permit the box to fall after the completion of the bale.

28. In a baling press, the combination with the baling rollers, of a baling frame, a removable bale box adapted to be inserted in said frame and movable vertically therein and provided with a vertically movable bottom, a pressure cylinder and piston for said baling frame, a part connected with said piston for engaging said movable bottom, means for connecting the bale box with said piston for elevating the bale box in said baling frame, and locking devices for holding said bale box in elevated position during the formation of the bale.

29. In a baling press, the combination with the baling rollers, of a baling frame, a bale box carried therein, means for forcing a transversely extending retaining bar upon the top of the bale after its completion and locking devices on the bale box for receiving a bar.

30. In a baling press, the combination with the baling rollers, one of which is provided with longitudinally disposed bar receiving notches, of a baling frame and a bale box carried thereby and provided with bar locking devices.

31. In a baling press, the combination with the baling rollers, one of which is provided with longitudinally disposed bar receiving recessed portions, of stationary guides having bar engaging faces concentric with the axis of said roller, a bale box, and bar locking devices thereon.

32. In a baling press, the combination with the baling rollers, one of which is provided with recessed portions extending longitudinally thereof to receive and insert a retaining bar, stationary guides having bar engaging faces concentric with the axis of said recessed roller, a baling frame, a bale box carried thereby provided with bar locking devices, and bar engaging guides on said box to receive the bar from said stationary cams.

33. In a baling press, the combination with the baling rollers, one of which is provided with recessed portions extending longitudinally thereof to receive and insert a retaining bar, an oscillating baling frame, a bale box carried thereby, and provided with bar locking devices.

34. In a baling press, the combination with the baling rollers, one of which is provided with recessed portions extending longitudinally thereof to receive and insert a retaining bar, an oscillating baling frame, a bale box carried thereby, and provided with bar locking devices, stationary guides having bar engaging faces concentric with the axis of said recessed roller, and guides carried by said bale box, adjacent to the bar locking devices thereof, and adapted to receive the bar from said stationary guide.

35. In a baling press, the combination with the baling rollers, one of which is recessed to receive and insert a retaining bar, of a bale box, and pivoted spring actuated bar locking hooks secured thereto.

36. In a baling press, the combination with the baling rollers, of an oscillating baling frame, a bale box carried thereby, and provided with bar locking devices and mechanical means for forcing a bar upon the top of the completed bale and into engagement with the said locking devices.

37. In a baling press, the combination with the baling rollers, of an oscillating baling frame, a bale box movable vertically therein, means for locking said bale box in raised position, bar locking devices on said bale box, and means connected with one of said rollers for forcing a transverse bar upon the top of the completed bale, and into engagement with said bar locking devices.

In testimony whereof I affix my signature, in the presence to two witnesses.

JAMES NELSON WOOD.

Witnesses:
Wm. P. De Saussure,
R. R. Florance.